US012015140B2

(12) United States Patent
Kusano et al.

(10) Patent No.: US 12,015,140 B2
(45) Date of Patent: Jun. 18, 2024

(54) METHOD FOR PRODUCING RESIN COLLECTOR FOR NEGATIVE ELECTRODES, METHOD FOR PRODUCING NEGATIVE ELECTRODE FOR LITHIUM ION BATTERIES, AND METHOD FOR PRODUCING LITHIUM ION BATTERY

(71) Applicants: SANYO CHEMICAL INDUSTRIES, LTD., Kyoto (JP); GUNZE LIMITED, Kyoto (JP)

(72) Inventors: Ryosuke Kusano, Kyoto (JP); Yasuhiro Tsudo, Kyoto (JP); Yasuji Maruyama, Shiga (JP); Kazuaki Onishi, Shiga (JP); Yasuhiko Ohsawa, Kanagawa (JP); Yuki Kusachi, Kanagawa (JP); Hajime Satou, Kanagawa (JP); Hiroshi Akama, Kanagawa (JP); Hideaki Horie, Kanagawa (JP)

(73) Assignees: SANYO CHEMICAL INDUSTRIES, LTD., Kyoto (JP); GUNZE LIMITED, Kyoto (JP)

( * ) Notice: Subject to any disclaimer, the term of this patent is extended or adjusted under 35 U.S.C. 154(b) by 356 days.

(21) Appl. No.: 17/285,682

(22) PCT Filed: Oct. 21, 2019

(86) PCT No.: PCT/JP2019/041282
§ 371 (c)(1),
(2) Date: Apr. 15, 2021

(87) PCT Pub. No.: WO2020/085290
PCT Pub. Date: Apr. 30, 2020

(65) Prior Publication Data
US 2021/0408525 A1 Dec. 30, 2021

(30) Foreign Application Priority Data
Oct. 22, 2018 (JP) .................. 2018-198530

(51) Int. Cl.
| H01M 4/139 | (2010.01) |
| B29C 48/00 | (2019.01) |
| B29C 48/08 | (2019.01) |
| B29C 48/21 | (2019.01) |
| H01M 4/04 | (2006.01) |
| H01M 4/66 | (2006.01) |
| H01M 10/0525 | (2010.01) |
| B29K 505/08 | (2006.01) |
| B29L 31/34 | (2006.01) |
| H01M 4/02 | (2006.01) |

(52) U.S. Cl.
CPC .......... *H01M 4/139* (2013.01); *B29C 48/001* (2019.02); *B29C 48/022* (2019.02); *B29C 48/08* (2019.02); *B29C 48/21* (2019.02); *H01M 4/04* (2013.01); *H01M 4/667* (2013.01); *H01M 4/668* (2013.01); *H01M 10/0525* (2013.01); *B29K 2505/08* (2013.01); *B29K 2995/0005* (2013.01); *B29L 2031/3468* (2013.01); *H01M 2004/027* (2013.01)

(58) Field of Classification Search
None
See application file for complete search history.

(56) References Cited

U.S. PATENT DOCUMENTS

| 4,521,359 A | 6/1985 | Tsien | |
| 2020/0243867 A1* | 7/2020 | Kusano | ............ H01M 10/0525 |

FOREIGN PATENT DOCUMENTS

| EP | 3 021 390 | 5/2016 |
| JP | 63-224103 | 9/1988 |
| JP | 10-100346 | 4/1998 |
| JP | 2002-8665 | 1/2002 |
| JP | 2002-124265 | 4/2002 |
| JP | 2011-153214 | 8/2011 |
| JP | 2014-216296 | 11/2014 |
| JP | 2014-529858 | 11/2014 |
| JP | 2015-201387 | 11/2015 |
| JP | 2018-137221 | 8/2018 |
| JP | 2018-198196 | 12/2018 |
| JP | 2018-198197 | 12/2018 |
| WO | 2012/046600 | 4/2012 |
| WO | 2013/028757 | 2/2013 |
| WO | 2015/005116 | 1/2015 |

OTHER PUBLICATIONS

International Search Report issued Jan. 28, 2020 in International (PCT) Application No. PCT/JP2019/041282.

* cited by examiner

*Primary Examiner* — Robert J Grun
(74) *Attorney, Agent, or Firm* — Wenderoth, Lind & Ponack, L.L.P.

(57) ABSTRACT

The present invention aims to provide a method for producing a pinhole-free thin resin current collector for negative electrodes. The method for producing a sheet-shaped resin current collector for negative electrodes of the present invention includes stacking three or more layers of melts of conductive resin compositions each containing a polyolefin and a conductive filler to obtain a multilayered body, wherein the polyolefin contained in each of the conductive resin compositions that form the respective layers of the multilayered body has a melt mass flow rate of 15 to 70 g/10 min as measured at a temperature of 230° C. and a load of 2.16 kg in accordance with JIS K7210-1:2014.

6 Claims, No Drawings

METHOD FOR PRODUCING RESIN COLLECTOR FOR NEGATIVE ELECTRODES, METHOD FOR PRODUCING NEGATIVE ELECTRODE FOR LITHIUM ION BATTERIES, AND METHOD FOR PRODUCING LITHIUM ION BATTERY

TECHNICAL FIELD

The present invention relates to methods for producing resin current collectors for negative electrodes, methods for producing negative electrodes for lithium ion batteries, and methods for producing lithium ion batteries.

BACKGROUND ART

Reduction of carbon dioxide emissions is strongly desired in these days for environmental protection. The automotive industry has a high expectation that the introduction of electric vehicles (EVs) or hybrid electric vehicles (HEVs) will reduce carbon dioxide emissions. The industry is extensively developing secondary batteries for driving motors, the key to practical use of those vehicles. Secondary batteries attracting attention include lithium ion batteries which have a high energy density and a high output power density.

A typical lithium ion secondary battery includes an electrode composed of a positive electrode current collector with a positive electrode active material applied thereto with a binder and an electrode composed of a negative electrode current collector with a negative electrode active material applied thereto with a binder. A bipolar battery includes a bipolar electrode composed of a current collector having, on one side, a positive electrode layer formed by applying a positive electrode active material with a binder, and on the other side, a negative electrode layer formed by applying a negative electrode active material with a binder.

Conventional lithium ion batteries include metal foils (metal foil current collectors) as current collectors. In these days, current collectors including conductive material-containing resin instead of metal foils, known as resin current collectors, are proposed. Resin current collectors are lighter than metal foil current collectors and are expected to increase the power output per unit weight of a battery.

For example, Patent Literature 1 discloses a conductive resin film for current collectors of secondary batteries. The film includes polymethylpentene and a conductive material and has a specific melt mass flow rate. Since polymethylpentene has a low surface tension, it has a relatively low adhesion to an active material layer. So, the interface resistance is probably high.

Patent Literature 2 discloses a dispersant for resin current collectors, a material for resin current collectors containing resin and a conductive filler, and a resin current collector including the material for resin current collectors. Patent Literature 2 describes polyethylene, polypropylene, or the like as the resin contained in the material for resin current collectors.

CITATION LIST

Patent Literature

Patent Literature 1: JP 2014-216296 A
Patent Literature 2: WO2015/005116

SUMMARY OF INVENTION

Technical Problem

Resin current collectors are desired to have a low resistance value and be as thin as possible. Unfortunately, the resin current collectors disclosed in Patent Literature 1 and other documents are likely to have a failure such as pinholes when they are thin. Thus, there is still a room for improvement to obtain pinhole-free thin resin current collectors.

The present invention aims to provide a method for producing a pinhole-free thin resin current collector for negative electrodes. The present invention also aims to provide a method for producing a negative electrode for lithium ion batteries and a method for producing a lithium ion battery, each method using the resin current collector for negative electrodes.

Solution to Problem

As a result of intensive studies to solve the issue, the present inventors arrived at the present invention.

Specifically, the present invention provides: a method for producing a sheet-shaped resin current collector for negative electrodes, including stacking three or more layers of melts of conductive resin compositions each containing a polyolefin and a conductive filler to obtain a multilayered body, wherein the polyolefin contained in each of the conductive resin compositions that form the respective layers of the multilayered body has a melt mass flow rate of 15 to 70 g/10 min as measured at a temperature of 230° C. and a load of 2.16 kg in accordance with JIS K7210-1:2014; a method for producing a negative electrode for lithium ion batteries, including producing a resin current collector for negative electrodes by the method and forming a negative electrode active material layer on one surface of the resin current collector for negative electrodes; and a method for producing a lithium ion battery, including producing a negative electrode for lithium ion batteries by the method.

Advantageous Effects of Invention

The method of the present invention includes stacking three or more layers of melts of conductive resin compositions each containing a polyolefin having a specific melt mass flow rate and a conductive filler to form one integrated film, so that the resulting resin current collector has a multilayered inner structure. The resin current collector having a multilayered inner structure is prevented from having pinholes even when it is thin. The method thus enables the production of a resin current collector for negative electrodes having low resistance and no pinhole even when it is thin.

DESCRIPTION OF EMBODIMENTS

Method for Producing a Resin Current Collector for Negative Electrodes

The method for producing a resin current collector for negative electrodes of the present invention includes stacking three or more layers of melts of conductive resin compositions each containing a polyolefin and a conductive filler.

First, a polyolefin, a conductive filler, and other optional components are mixed to prepare a conductive resin composition. Examples of the mixing method include: a method involving forming a masterbatch containing a conductive filler and mixing the masterbatch with a polyolefin; a method involving using a masterbatch containing a polyolefin, a conductive filler, and other optional components; and a method involving concurrently mixing all the raw materials. The mixing may be performed by mixing the components each in the shape of pellet or powder with a proper known mixer such as a kneader, an internal mixer, a Banbury mixer, or a roll.

The components may be added in any order during the mixing. The resulting mixture may be pelletized or powdered using a pelletizer.

Then, three or more layers of molten conductive resin compositions are stacked into one integrated film, thereby preparing a multilayered body. The film formation may be performed by a known technique usable in film production. Examples of a specific technique include co-extrusion involving stacking conductive resin compositions to form layers of the multilayered body in a die. The co-extrusion may be performed by a known method such as a T-die method or an inflation method.

For example, co-extrusion by a T-die method involves co-extruding molten conductive resin compositions to form layers of the multilayered body, and rolling (including compression by heat-pressing) them so that the molten conductive resin compositions are fusion-bonded with each other into one integrated film.

In the method for producing a resin current collector for negative electrodes of the present invention, three or more layers of molten conductive resin compositions are stacked into one integrated film, so that the resulting resin current collector has a multilayered inner structure. The multilayered inner structure of the resin current collector prevents growth of a pinhole made in one of the layers during the film formation, unless the pinhole overlaps another pinhole made in any other layer. Thus, pinhole formation can be reduced even when the film is thin.

In the method for producing a resin current collector for negative electrodes of the present invention, the multilayered body including three or more layers may be prepared by stacking three layers of conductive resin compositions, four layers of conductive resin compositions, five layers of conductive resin compositions, or six or more layers of conductive resin compositions.

In the method for producing a resin current collector for negative electrodes of the present invention, the conductive resin compositions having the same component composition and the same component contents with each other may be stacked, or those having different component compositions and different component contents with each other may be stacked. When conductive resin compositions having different component compositions and different component contents are stacked, all the conductive resin compositions do not necessarily have different component compositions and different component contents with each other. The conductive resin compositions may include those which have the same component composition and the same component contents with each other.

In the method for producing a resin current collector for negative electrodes of the present invention, the polyolefin contained in each of the conductive resin compositions that form the respective layers of the multilayered body has a melt mass flow rate of 15 to 70 g/10 min as measured at a temperature of 230° C. and a load of 2.16 kg in accordance with JIS K7210-1:2014. The polyolefin contained in each conductive resin composition preferably has a melt mass flow rate of 20 to 40 g/10 min.

The polyolefin contained in each conductive resin composition may be a mixture of a plurality of polypropylenes. In this case, a weighted average value of the melt mass flow rates of the plurality of polypropylenes is defined as the melt mass flow rate of the polyolefin.

The melt mass flow rate (MFR) refers to an index of the fluidity of a molten resin. A higher MFR indicates a higher fluidity.

As described earlier, in the method for producing a resin current collector for negative electrodes of the present invention, a multilayered body can be obtained by stacking three or more layers of molten conductive resin compositions into one integrated film. The use of a polyolefin having a melt mass flow rate of 15 to 50 g/10 min enables favorable formation of a film entirely having a thickness of 90 μm or less, for example.

Examples of the polyolefin contained in each conductive resin composition include polyethylene (PE) and polypropylene (PP). Examples also include polymers each including C4-C30 α-olefin (1-butene, isobutene, 1-hexene, 1-decene, 1-dodecene, or the like) as an essential monomer. One of the polyolefins may be used alone, or two or more of these may be used in admixture.

Preferred of the polyolefins is polypropylene owing to the moisture proofness and mechanical strength. Examples of the polypropylene include homopolypropylene, random polypropylene, block polypropylene, branched long-chain polypropylene, and acid-modified polypropylene. The term "homopolypropylene" refers to a propylene homopolymer. The term "random polypropylene" refers to a copolymer containing a small amount (preferably 4.5% by weight or less) of randomly arranged ethylene units. The term "block polypropylene" refers to a composition including a homopolypropylene in which ethylene propylene rubber (EPR) is dispersed. The composition has a "sea-island structure" in which an "island" containing EPR floats on a "sea" of the homopolypropylene. Examples of the branched long-chain polypropylene include the polypropylene described in JP 2001-253910 A. The term "acid-modified polypropylene" refers to a polypropylene containing a carboxyl group. It may be obtained by a known reaction, for example, reacting an unsaturated carboxylic acid such as maleic anhydride with a polypropylene in the presence of an organic peroxide.

In the method for producing a resin current collector for negative electrodes of the present invention, from the standpoint of the strength of the current collector, the weight ratio of the polyolefin contained in each of the conductive resin compositions that form the respective layers of the multilayered body is preferably 10 to 95% by weight, more preferably 25 to 85% by weight based on the total weight of the polyolefin and the conductive filler contained in the conductive resin composition.

In the method for producing a resin current collector for negative electrodes of the present invention, the conductive filler contained in each of the conductive resin compositions that form the respective layers of the multilayered body is selected from conductive materials. From the standpoint of suppressing ion permeation in the current collector, the conductive materials are preferably materials having no conductivity for ions that are used as charge transfer media. Herein, the term "ions that are used as charge transfer media" refers to lithium ions when used for lithium ion batteries, for example.

Non-limiting examples of the materials of the conductive filler include metals such as nickel, aluminum, stainless steel (SUS), silver, copper, and titanium; conductive carbons such as graphite, carbon black (e.g., acetylene black, Ketjenblack, furnace black, channel black, and thermal lamp black), and carbon nanotubes; and mixtures of these. Alternatively, the conductive filler may be a material formed by plating a particulate ceramic material or a resin material with a conductive material (metal one among the above-mentioned conductive fillers). Each of these conductive fillers may be used alone, or two or more of these may be used in combination. Alloys or metal oxides of these conductive fillers are also usable.

The conductive filler preferably includes a metal or a conductive carbon from the standpoint of electric stability. Nickel particles are preferred among metals. The conductive carbon is preferably carbon black or a mixture of carbon black and a carbon nanotube, more preferably acetylene black or a mixture of acetylene black and a carbon nanotube.

When the conductive filler includes nickel particles, the median size of the nickel particles is not limited. From the standpoint of the electric properties of batteries, the nickel particles have a median size of preferably 1 to 20 µm.

The term "median size" herein refers to a median size based on the volume distribution. It is measured using a laser particle size distribution analyzer (LA-920 available from Horiba Ltd.).

When the conductive filler includes carbon black, the carbon black has a volume average particle size of preferably, though not limited to, 3 to 500 nm from the standpoint of the electric properties of batteries.

Herein, the term "volume average particle size" of the conductive carbon such as carbon black refers to the volume median diameter (Dv 50) in a particle size distribution determined by the Microtrac method (laser diffraction and scattering method). The Microtrac method determines a particle size distribution by using light scattered from the particles irradiated with laser light. The volume average particle size can be measured using a device such as Microtrac available from Nikkiso Co., Ltd.

The shape (form) of the conductive filler is not limited to the particulate form and may not be the particulate form. For example, the conductive filler may be in the form of a carbon nanotube or the like which is practically employed as the form of a filler-type conductive material.

In the method for producing a resin current collector for negative electrodes of the present invention, the multilayered body preferably includes at least two layers of conductive resin compositions each containing a polyolefin and nickel particles. When the conductive resin compositions in the at least two layers of the multilayered body contain nickel particles as a conductive filler, the resulting resin current collector can obtain better electric stability.

When the conductive resin compositions in the at least two layers of the multilayered body contain nickel particles as a conductive filler, the conductive resin composition in any other layer of the multilayered body may not contain nickel particles as a conductive filler. Alternatively, all the conductive resin compositions in all the layers of the multilayered body may contain nickel particles as a conductive filler.

When the conductive resin compositions contain nickel particles as a conductive filler, the multilayered body preferably includes a structure in which a first conductive resin composition and a second conductive resin composition having a lower weight ratio of nickel particles than the first conductive resin composition are preferably stacked in the order of the first conductive resin composition, the second conductive resin composition, and the first conductive resin composition. This structure can reduce the contact resistance between the resin current collector and an active material layer.

For example, in the case of stacking three layers of conductive resin compositions, preferably, the first conductive resin composition, the second conductive resin composition, and the first conductive resin composition are stacked in said order; in the case of stacking four layers of conductive resin compositions, preferably, the first conductive resin composition, the second conductive resin composition, the second conductive resin composition, and the first conductive resin composition are stacked in said order; and in the case of stacking five layers of conductive resin compositions, preferably, the first conductive resin composition, the second conductive resin composition, the first conductive resin composition, the second conductive resin composition, and the first conductive resin composition are stacked in said order. When two or more first conductive resin compositions are included, they may have the same component composition and the same component contents with each other, or they may include a first conductive resin composition having a different component composition and/or different component contents. Likewise, when two or more second conductive resin compositions are included, they may have the same component composition and the same component contents with each other, or they may include a second conductive resin composition having a different component composition and/or different component contents.

In the method for producing a resin current collector for negative electrodes of the present invention, the multilayered body preferably includes a layer of a conductive resin composition containing nickel particles as the conductive filler and a layer of a conductive resin composition containing a conductive carbon as the conductive filler. The multilayered body having such a structure preferably includes at least two layers of conductive resin compositions each containing nickel particles as the conductive filler. The structure including a conductive resin composition containing nickel particles as the conductive filler and a conductive resin composition containing a conductive carbon as the conductive filler can reduce the density of conductive fillers in the entirety of the resin current collector.

For example, in the case of stacking three layers of conductive resin compositions, preferably, a conductive resin composition containing nickel particles as the conductive filler, a conductive resin composition containing nickel particles as the conductive filler, and a conductive resin composition containing a conductive carbon as the conductive filler are stacked in said order. Specifically, a conductive resin composition containing a conductive carbon as the conductive filler is preferably stacked as an outermost layer defining at least one main surface of the multilayered body.

In the method for producing a resin current collector for negative electrodes of the present invention, from the standpoint of conductivity, the weight ratio of the conductive filler contained in each of the conductive resin compositions that form the respective layers of the multilayered body is preferably 5 to 90% by weight, more preferably 15 to 75% by weight based on the total weight of the polyolefin and the conductive filler contained in the conductive resin composition.

In a conductive resin composition containing nickel particles as the conductive filler, the weight ratio of the nickel particles in the conductive resin composition is preferably 55 to 90% by weight, more preferably 60 to 75% by weight based on the total weight of the polyolefin and the nickel particles contained in the conductive resin composition.

In a conductive resin composition containing carbon black as the conductive filler, the weight ratio of the carbon black in the conductive resin composition is preferably 15 to 45% by weight, more preferably 20 to 30% by weight based on the total weight of the polyolefin and the carbon black contained in the conductive resin composition. In a conductive resin composition containing a mixture of carbon black and a carbon nanotube as the conductive filler, the weight ratio of the total weight of the carbon black and the carbon nanotube in the conductive resin composition is preferably 10 to 40% by weight, more preferably 15 to 30% by weight based on the total weight of the polyolefin, the carbon black, and the carbon nanotube contained in the conductive resin composition.

In the method for producing a resin current collector for negative electrodes of the present invention, the conductive resin compositions may contain other appropriate components (e.g., dispersants, crosslinking accelerators, crosslinking agents, colorants, ultraviolet absorbers, and plasticizers) which do not impair the effects of the present invention in addition to the polyolefin and the conductive filler.

In the method for producing a resin current collector for negative electrodes of the present invention, the thickness of the multilayered body is not limited. Yet, the multilayered body preferably has a thickness of 90 μm or less. When the multilayered body has a thickness of 90 μm or less, the resin current collector has a low resistance value. The multilayered body has a thickness of 5 μm or more.

The thickness of the multilayered body refers to a thickness excluding the thickness of a metal layer described below.

The method for producing a resin current collector for negative electrodes of the present invention preferably further includes forming a metal layer on at least one of two main surfaces of the multilayered body. The metal layer refers to a layer that can reduce resistance and may be formed by, for example, sputtering or other methods.

Examples of the metal contained in the metal layer include copper. The metal layer preferably has a thickness of 40 to 100 nm, though not limited thereto.

Method for Producing a Negative Electrode for Lithium Ion Batteries

The method for producing a negative electrode for lithium ion batteries of the present invention includes: producing a resin current collector for negative electrodes by the above-described method, and forming a negative electrode active material layer on one surface of the resin current collector for negative electrodes.

In the method for producing a negative electrode for lithium ion batteries of the present invention, the negative electrode active material layer may be formed by using a negative electrode active material and optionally using additives such as a binder and a conductive auxiliary agent.

Method for Producing a Lithium Ion Battery

The method for producing a lithium ion battery of the present invention includes producing a negative electrode for lithium ion batteries by the above-described method.

The method for producing a lithium ion battery of the present invention further includes forming a positive electrode active material layer on a surface of a current collector for positive electrodes. The positive electrode active material layer may be formed by using a positive electrode active material and optionally using additives such as a binder and a conductive auxiliary agent. A lithium ion battery is produced by placing a separator and adding an electrolyte solution.

In the method for producing a negative electrode for lithium ion batteries of the present invention and the method for producing a lithium ion battery of the present invention, known materials may be used as the materials of the negative electrode active material, the positive electrode active material, an electrolyte solution, or a separator. The positive electrode active material and the negative electrode active material may be coated active materials coated with resin such as an acrylic resin. The current collector for positive electrodes may be a metal foil current collector or a resin current collector.

The electrolyte solution includes one containing an electrolyte and a non-aqueous solvent, which is used in the production of lithium ion batteries. The electrolyte to be contained in the electrolyte solution may be one that is used in a known electrolyte solution. Examples include lithium salts of inorganic acids such as $LiPF_6$, $LiBF_4$, $LiSbF_6$, $LiAsF_6$ and $LiClO_4$; and lithium salts of organic acids such as $LiN(CF_3SO_2)_2$, $LiN(C_2F_5SO_2)_2$, and $LiC(CF_3SO_2)_3$. $LiPF_6$ is preferred among these from the standpoint of output power and charge-discharge cycle characteristics of the battery. The non-aqueous solvent to be contained in the electrolyte solution may be one that is used in a known electrolyte solution, and examples include carbonates such as ethylene carbonate (EC), propylene carbonate (PC), dimethyl carbonate (DMC), diethyl carbonate (DEC), and ethyl methyl carbonate (EMC).

EXAMPLES

The present invention will be specifically described below with reference to examples. The present invention is not limited to the examples without departing from the scope of the present invention. The "part(s)" and "%" refer to part(s) by weight and % by weight, respectively, unless otherwise specified.

Production Example 1

An amount of 22.4 parts of polypropylene having a high MFR (PP1 in Table 1) [specific gravity: 0.9, MFR: 60 g/10 min, melting point: 165° C.], 5.6 parts of polypropylene having a low MFR (PP2 in Table 1) [specific gravity: 0.9, MFR: 8.2 g/10 min, melting point: 165° C.], 2.0 parts of a dispersant [specific gravity: 0.95, MFR: 230 g/10 min, acid value: 26, melting point: 142° C.], and 70 parts of nickel particles [trade name "Type 255" available from Vale, median size: 20 μm] as a conductive filler were melt-kneaded with a twin screw extruder at 180° C., 100 rpm, and a residence time of five minutes, thereby obtaining a conductive resin composition (Z-1).

The term "polyolefin MFR" in Table 1 refers to the MFR of a mixture of PP1 and PP2.

Production Example 2

A conductive resin composition (Z-2) was obtained as in Production Example 1, except that the amounts of the PP1, the PP2, the dispersant, and the nickel particles were changed to 26.1 parts, 6.5 parts, 2.4 parts, and 65 parts, respectively.

Production Example 3

A conductive resin composition (Z-3) was obtained as in Production Example 1, except that the amounts of the PP1, the PP2, the dispersant, and the nickel particles were changed to 29.9 parts, 7.5 parts, 2.6 parts, and 60 parts, respectively.

Production Example 4

A conductive resin composition (Z-4) was obtained as in Production Example 1, except that the amounts of the PP1, the PP2, the dispersant, and the nickel particles were changed to 33.6 parts, 8.4 parts, 3.0 parts, and 55 parts, respectively.

Production Example 5

A conductive resin composition (Z-5) was obtained as in Production Example 1, except that the PP1 was not used, and the amounts of the PP2, the dispersant, and the nickel particles were changed to 32.7 parts, 2.3 parts, and 65 parts, respectively.

Production Example 6

A conductive resin composition (Z-6) was obtained as in Production Example 5, except that the amounts of the PP2, the dispersant, and the nickel particles were changed to 21.5 parts, 1.5 parts, and 77 parts, respectively.

Production Example 7

A conductive resin composition (Z-7) was obtained as in Production Example 1, except that the PP2 was not used, the amounts of the PP1 and the dispersant were changed to 74.7 parts and 5.3 parts, respectively, and the conductive filler was changed to 20 parts of acetylene black [trade name "DENKA BLACK Li-400" available from Denka Company Limited, volume average particle size: 48 nm, specific surface area: 39 m$^2$/g].

Production Example 8

A conductive resin composition (Z-8) was obtained as in Production Example 7, except that the amounts of the PP1, the dispersant, and the acetylene black were changed to 70.0 parts, 5.0 parts, and 25 parts, respectively.

Production Example 9

A conductive resin composition (Z-9) was obtained as in Production Example 1, except that the PP2 was not used, the amounts of the PP1 and the dispersant were changed to 76.5 parts and 5.5 parts, respectively, and the conductive filler was changed to 10 parts of acetylene black [trade name "DENKA BLACK Li-400" available from Denka Company Limited, specific surface area: 39 m$^2$/g, average primary particle size: 48 nm] and 8 parts of a carbon nanotube [trade name "1201YJE" available from NANOSTRUCTURED & AMORPHOUS MATERIALS] ("CNT" in Table 1).

Measurement of Penetration Resistance Value

Table 1 shows the penetration resistance values of the conductive resin compositions (Z-1) to (Z-9) measured by the following method.

Each conductive resin composition was extruded from a T-die and rolled with a heat pressor, thereby preparing a measurement film having a film thickness of 120 μm.

The measurement film was cut into a ϕ15 mm strip specimen. The resistance value of the measurement film was measured with an electrical resistance measuring device (IMC-0240 model, available from Imoto machinery Co., LTD.) and a resistance meter (RM3548, available from Hioki E. E. Corporation).

The resistance value of the measurement film was measured with the electrical resistance measuring device under a load of 2.16 kg. The resistance measured after applying a load of 2.16 kg for 60 seconds was determined as the resistance value of the measurement film. The penetration resistance value was determined by multiplying the resistance value with the area (1.77 cm$^2$) of the contact surface of a jig upon the resistance measurement as shown in the expression below.

Penetration resistance value (Ω·cm$^2$)=Resistance value(Ω)×1.77 (cm$^2$)

TABLE 1

| Conductive resin composition | | Polyolefin | | | Conductive filler | | Polyolefin MFR (g/10 min) | Penetration resistance value (Ω · cm$^2$) |
|---|---|---|---|---|---|---|---|---|
| Z-1 | Composition | PP1 | PP2 | Dispersant | Ni particles | — | 35 | 0.8 |
|  | Proportion | 22.4 | 5.6 | 2.0 | 70 | — |  |  |
| Z-2 | Composition | PP1 | PP2 | Dispersant | Ni particles | — | 34 | 10 |
|  | Proportion | 26.1 | 6.5 | 2.4 | 65 | — |  |  |
| Z-3 | Composition | PP1 | PP2 | Dispersant | Ni particles | — | 36 | 120 |
|  | Proportion | 29.9 | 7.5 | 2.6 | 60 | — |  |  |
| Z-4 | Composition | PP1 | PP2 | Dispersant | Ni particles | — | 35 | 800 |
|  | Proportion | 33.6 | 8.4 | 3.0 | 55 | — |  |  |
| Z-5 | Composition | — | PP2 | Dispersant | Ni particles | — | 10 | 20 |
|  | Proportion | — | 32.7 | 2.3 | 65 | — |  |  |
| Z-6 | Composition | — | PP2 | Dispersant | Ni particles | — | 11 | 0.4 |
|  | Proportion | — | 21.5 | 1.5 | 77 | — |  |  |
| Z-7 | Composition | PP1 | — | Dispersant | Acetylene black | — | 65 | 80 |
|  | Proportion | 74.7 | — | 5.3 | 20 | — |  |  |
| Z-8 | Composition | PP1 | — | Dispersant | Acetylene black | — | 64 | 5 |
|  | Proportion | 70.0 | — | 5.0 | 25 | — |  |  |
| Z-9 | Composition | PP1 | — | Dispersant | Acetylene black | CNT | 66 | 6.5 |
|  | Proportion | 76.5 | — | 5.5 | 10 | 8 |  |  |

Example 1

Three layers consisting of the conductive resin composition (Z-1)/the conductive resin composition (Z-2)/the conductive resin composition (Z-2) were co-extruded from a T-die to prepare a conductive film. The conductive film was subjected to thickness measurement and a pinhole test as described below. The conductive film with a different thickness was prepared by changing the extrusion conditions and then subjected to the pinhole test. This operation was repeated. The thinnest pinhole-free conductive film (film thickness 85 μm) was selected as a resin current collector (X-1).

Example 2

Three layers consisting of the conductive resin composition (Z-1)/the conductive resin composition (Z-2)/the conductive resin composition (Z-3) were co-extruded from a T-die and rolled with a heat pressor to prepare a conductive film. As in Example 1, the thinnest pinhole-free conductive film (film thickness 70 μm) was selected as a resin current collector (X-2).

Example 3

Three layers consisting of the conductive resin composition (Z-3)/the conductive resin composition (Z-3)/the conductive resin composition (Z-3) were co-extruded from a T-die to prepare a conductive film. As in Example 1, the thinnest pinhole-free conductive film (film thickness 50 μm) was selected as a resin current collector (X-3).

Example 4

Four layers consisting of the conductive resin composition (Z-1)/the conductive resin composition (Z-2)/the conductive resin composition (Z-2)/the conductive resin composition (Z-1) were co-extruded from a T-die and rolled with a heat pressor to prepare a conductive film. As in Example 1, the thinnest pinhole-free conductive film (film thickness 90 μm) was selected as a resin current collector (X-4).

Example 5

Three layers consisting of the conductive resin composition (Z-3)/the conductive resin composition (Z-3)/the conductive resin composition (Z-7) were co-extruded from a T-die to prepare a conductive film. As in Example 1, the thinnest pinhole-free conductive film (film thickness 45 μm) was selected as a resin current collector (X-5).

Example 6

Three layers consisting of the conductive resin composition (Z-2)/the conductive resin composition (Z-3)/the conductive resin composition (Z-8) were co-extruded from a T-die and rolled with a heat pressor to prepare a conductive film. As in Example 1, the thinnest pinhole-free conductive film (film thickness 65 μm) was selected as a resin current collector (X-6).

Example 7

Three layers consisting of the conductive resin composition (Z-2)/the conductive resin composition (Z-3)/the conductive resin composition (Z-9) were co-extruded from a T-die and rolled with a heat pressor to prepare a conductive film. As in Example 1, the thinnest pinhole-free conductive film (film thickness 60 μm) was selected as a resin current collector (X-7).

Example 8

Five layers consisting of the conductive resin composition (Z-1)/the conductive resin composition (Z-2)/the conductive resin composition (Z-1)/the conductive resin composition (Z-2)/the conductive resin composition (Z-1) were co-extruded from a T-die and rolled with a heat pressor to prepare a conductive film. As in Example 1, the thinnest pinhole-free conductive film (film thickness 90 μm) was selected as a resin current collector (X-8).

Example 9

Three layers consisting of the conductive resin composition (Z-3)/the conductive resin composition (Z-3)/the conductive resin composition (Z-7) were co-extruded from a T-die to prepare a conductive film. As in Example 1, the thinnest pinhole-free conductive film (film thickness 45 μm) was selected, and a copper film having a thickness of 40 nm was formed by sputtering on the film on the conductive resin composition (Z-3) side. The resulting workpiece was determined as a resin current collector (X-9).

Comparative Example 1

Three layers consisting of the conductive resin composition (Z-5)/the conductive resin composition (Z-6)/the conductive resin composition (Z-5) were co-extruded from a T-die and rolled with a heat pressor to prepare a conductive film. As in Example 1, the thinnest pinhole-free conductive film (film thickness 120 μm) was selected as a resin current collector (X'-1).

Comparative Example 2

Two layers consisting of the conductive resin composition (Z-1)/the conductive resin composition (Z-4) were co-extruded from a T-die and rolled with a heat pressor to prepare a conductive film. As in Example 1, the thinnest pinhole-free conductive film (film thickness 60 μm) was selected as a resin current collector (X'-2).

Comparative Example 3

Two layers consisting of the conductive resin composition (Z-1)/the conductive resin composition (Z-2) were co-extruded from a T-die and rolled with a heat pressor to prepare a conductive film. As in Example 1, the thinnest pinhole-free conductive film (film thickness 100 μm) was selected as a resin current collector (X'-3).

Comparative Example 4

A monolayer of the conductive resin composition (Z-5) was extruded from a T-die and rolled with a heat pressor to prepare a conductive film. As in Example 1, the thinnest pinhole-free conductive film (film thickness 110 μm) was selected as a resin current collector (X'-4).

Tests on Conductive Films

Thickness Measurement

The thicknesses at five points of each conductive film sample were measured with a micrometer (Mitutoyo Corporation). An average of the measured thicknesses was determined as the thickness of the sample.

Pinhole Test

Methanol was fed in a SUS container so as to have a thickness of about 1 to 2 mm. The conductive film cut into a size of 10 cm×20 cm was floated on the methanol. While keeping the conductive film afloat, the conductive film was tapped at the upper surface, and whether the methanol permeated was visually observed. A pinhole was considered to be present if at least one methanol-permeated portion was confirmed.

Evaluations of Resin Current Collectors

Film Thickness Reduction

The film thickness of the thinnest pinhole-free conductive film in the pinhole test was measured. The conductive film having a thickness of 90 μm or less was judged as ○ (good) and one having a thickness of more than 90 μm was judged as × (poor).

Measurement of Penetration Resistance Value

The resin current collectors (X-1) to (X-9) and (X'-1) to (X'-4) were each cut into a φ15 mm strip specimen. The resistance values of the resin current collectors were measured using the specimens with an electrical resistance measurement device (IMC-0240 model, available from Imoto machinery Co., LTD.) and a resistance meter (RM3548 available from Hioki E. E. Corporation).

The resistance values of the resin current collectors were measured with the electrical resistance measuring device under a load of 2.16 kg. The resistance measured after applying a load of 2.16 kg for 60 seconds was determined as the resistance value of the resin current collector. The penetration resistance value was determined by multiplying the resistance value with the area (1.77 cm$^2$) of the contact surface of a jig upon the resistance measurement as shown in the expression below.

Penetration resistance value (Ω·cm$^2$)=Resistance value(Ω)×1.77 (cm$^2$)

The criteria for the penetration resistance value are as follows: resistance value of 200 Ω·cm$^2$ or less; ○ (good), and resistance value of more than 200 Ω·cm$^2$; × (poor).

Table 2 shows the evaluation results.

TABLE 2

|  | First layer | Second layer | Third layer | Fourth layer | Fifth layer | Penetration resistance value (Ω · cm$^2$) | Judgment | Thickness of pinhole-free film (μm) | Judgment |
|---|---|---|---|---|---|---|---|---|---|
| Example 1 | Z-1 | Z-2 | Z-2 | — | — | 3 | ○ | 85 | ○ |
| Example 2 | Z-1 | Z-2 | Z-3 | — | — | 25 | ○ | 70 | ○ |
| Example 3 | Z-3 | Z-3 | Z-3 | — | — | 120 | ○ | 50 | ○ |
| Example 4 | Z-1 | Z-2 | Z-2 | Z-1 | — | 1 | ○ | 90 | ○ |
| Example 5 | Z-3 | Z-3 | Z-7 | — | — | 100 | ○ | 45 | ○ |
| Example 6 | Z-2 | Z-3 | Z-8 | — | — | 8 | ○ | 65 | ○ |
| Example 7 | Z-2 | Z-3 | Z-9 | — | — | 12 | ○ | 60 | ○ |
| Example 8 | Z-1 | Z-2 | Z-1 | Z-2 | Z-1 | 1 | ○ | 90 | ○ |
| Example 9 | Z-3 | Z-3 | Z-7 | — | — | 40 | ○ | 45 | ○ |
| Comparative Example 1 | Z-5 | Z-6 | Z-5 | — | — | 1.6 | ○ | 120 | X |
| Comparative Example 2 | Z-1 | Z-4 | — | — | — | 350 | X | 60 | ○ |
| Comparative Example 3 | Z-1 | Z-2 | — | — | — | 2 | ○ | 100 | X |
| Comparative Example 4 | Z-5 | — | — | — | — | 1.8 | ○ | 110 | X |

Table 2 demonstrates that the resin current collectors in Examples 1 to 9 produced by stacking three or more layers of conductive resin compositions each containing a polyolefin having a melt mass flow rate of 15 to 70 g/10 min and a conductive filler have a low penetration resistance value and no pinhole even when they have a thickness of 90 μm or less.

In contrast, the resin current collector in Comparative Example 1 produced by stacking three layers of conductive resin compositions each containing a polyolefin having a melt mass flow rate of less than 15 g/10 min and a conductive filler does not achieve a pinhole-free film having a thickness of 90 μm or less.

With regard to the resin current collectors produced by stacking two layers of conductive resin compositions each containing a polyolefin having a melt mass flow rate of 15 to 70 g/10 min and a conductive filler, the resin current collector in Comparative Example 2 achieves a pinhole-free film having a thickness of 90 μm or less, while the resin current collector in Comparative Example 3 fails to achieve a pinhole-free film having a thickness of 90 μm or less.

The resin current collector in Comparative Example 4 produced using a monolayer of a conductive resin composition containing a polyolefin having a melt mass flow rate of 15 to 70 g/10 min and a conductive filler fails to achieve a pinhole-free film having a thickness of 90 μm or less.

INDUSTRIAL APPLICABILITY

The method for producing a resin current collector for negative electrodes of the present invention is useful for producing current collectors for negative electrodes for lithium ion batteries used particularly in mobile phones, personal computers, hybrid vehicles, and electric vehicles.

The invention claimed is:

1. A method for producing a sheet-shaped resin current collector for negative electrodes, comprising
   stacking three or more layers of melts of conductive resin compositions each containing a polyolefin and a conductive filler to obtain a multilayered body,
   wherein the polyolefin contained in each of the conductive resin compositions that form the respective layers of the multilayered body has a melt mass flow rate of 15 to 70 g/10 min as measured at a temperature of 230° C. and a load of 2.16 kg in accordance with JIS K7210-1:2014, and
   wherein the multilayered body includes a layer of a conductive resin composition containing nickel particles as the conductive filler and a layer of a conductive resin composition containing a conductive carbon as the conductive filler.

2. The method for producing a resin current collector for negative electrodes according to claim 1,
   wherein the multilayered body includes at least two layers of conductive resin compositions each containing a polyolefin and nickel particles.

3. The method for producing a resin current collector for negative electrodes according to claim 1,
   wherein the weight ratio of the conductive filler contained in each of the conductive resin compositions that form the respective layers of the multilayered body is 15 to 75% by weight based on the total weight of the polyolefin and the conductive filler contained in the conductive resin composition.

4. The method for producing a resin current collector for negative electrodes according to claim 1,
   wherein the multilayered body comprises two main surfaces, and the method further comprises forming a metal layer on at least one of the two main surfaces of the multilayered body.

5. A method for producing a negative electrode for lithium ion batteries, comprising
   producing a resin current collector for negative electrodes by the method according to claim 1, and
   forming a negative electrode active material layer on one surface of the resin current collector for negative electrodes.

6. A method for producing a lithium ion battery, comprising
   producing a negative electrode for lithium ion batteries by the method according to claim 5.

* * * * *